United States Patent [19]

Sugi et al.

[11] Patent Number: 5,277,988
[45] Date of Patent: Jan. 11, 1994

[54] EASILY OPENABLE HEAT SEAL MATERIAL

[75] Inventors: Masahiro Sugi, Ichihara; Takasi Nakagawa, Ohtake, both of Japan

[73] Assignee: Mitsui Petrochemical Industries, Ltd., Tokyo, Japan

[21] Appl. No.: 826,666

[22] Filed: Jan. 29, 1992

Related U.S. Application Data

[63] Continuation of Ser. No. 281,341, Dec. 8, 1988, abandoned.

[30] Foreign Application Priority Data

Dec. 15, 1987 [JP] Japan .................................. 62-317191

[51] Int. Cl.$^5$ ...................... B32B 27/32; C08L 23/04; C08L 23/12; C08L 23/16
[52] U.S. Cl. .................................... 428/516; 428/349; 525/240; 524/528
[58] Field of Search ................... 428/516, 349; 525/240

[56] References Cited

U.S. PATENT DOCUMENTS

| | | | |
|---|---|---|---|
| 4,499,241 | 2/1985 | Yoshimura et al. | 525/240 |
| 4,859,514 | 8/1989 | Friedrich et al. | 428/516 |

FOREIGN PATENT DOCUMENTS

| | | |
|---|---|---|
| 0144642 | 6/1985 | European Pat. Off. . |
| 0196727 | 10/1986 | European Pat. Off. . |
| 253792 | 1/1988 | European Pat. Off. . |
| 2956402 | 10/1987 | France . |
| 57-174329 | 10/1982 | Japan . |
| 58-209550 | 12/1983 | Japan . |

OTHER PUBLICATIONS

Boenig–"Polyolefins" Nov. 1986 p. 81.

*Primary Examiner*—Carman J. Seccuro, Jr.
*Attorney, Agent, or Firm*—Sherman and Shalloway

[57] ABSTRACT

A heat seal material having a plurality of resin surfaces which are positioned face to face and can be heat-fused together, at least one of the resin surfaces being formed of a resin composition comprising (A) 30 to 85% by weight of low-density polyethylene having a density of 0.91 to 0.94 g/cm$^3$ and a crystallinity of more than 40%,
(B) 5 to 40% by weight of polypropylene, and
(C) 10 to 40% by weight of a low-crystalline or substantially amorphous ethylene/alpha-olefin copolymer.

4 Claims, No Drawings

EASILY OPENABLE HEAT SEAL MATERIAL

This application is a continuation of application Ser. No. 07/281,341, filed Dec. 8, 1988, now abandoned.

This invention relates to a heat seal material having easy openability, and more specifically, to a beat seal material having excellent low-temperature heat sealability and easy openability with little heat sealing temperature dependence of its heat seal strength.

Important properties required of a packaging material are seal protecting property by which an article packed by the packaging material is protected from external forces such as impact, vibration and compression that occur during production and in the distribution chain including shipping, transportation and storage, and easy openability by which the packed article can be easily taken out by opening the seal portion without breaking the packing material as a whole. These two properties are inconsistent, and fillability, the distribution chain, and the object for which the packaging material is to be used must be carefully considered in designing the heat seal strength.

Packaging materials having easy openability have been proposed. For example, Japanese Laid-Open Patent Publication No. 174329/1982 discloses a packaging material formed by extrusion from a resin composition comprising high-pressure process low-density polyethylene, linear low density polyethylene and a low crystalline or amorphous ethylene/alpha-olefin copolymer. Japanese Laid-Open Patent Publication No. 209550/1983 discloses an easily openable laminated material for sealed packaging having a sealant layer composed of a film of a blend of polypropylene, high-density polyethylene and low-density polyethylene. Japanese Laid-Open Patent Publication No. 246061/1986 discloses a sealable packaging material having a sealant layer composed of a composition comprising polypropylene as a main component and an ethylene/alpha-olefin random copolymer.

Polypropylene has found wide applications as packaging films and containers for foods, textiles, industrial materials, chemicals, etc. because of its good transparency, excellent moisture-proofness, moderate stiffness and boiling water resistance.

The aforesaid conventional sealing materials are not entirely satisfactory for application to packaging films and containers of polypropylene. For example, the resin composition described in Japanese Laid-Open Patent Publication No. 174329/1982 is composed entirely of polyethylene-type resins, and its heat seal strength with respect to a polypropylene film or container is insufficient. The packaging laminated material described in Japanese Laid-Open Patent Publication No. 209550/1983 has a heat seal strength of the practical level. The sealing layer composition is susceptible to cohesive destruction, and part of the sealing layer may be left on the peeled surface. The packaging composition described in Japanese Laid-Open Patent Publication No. 246061/1986 which has a large polypropylene content requires a high heat sealing temperature. As a result, the speed of processing is low, and the temperature dependence of the heat seal strength is not entirely satisfactory.

It is a primary object of this invention to provide a heat seal material which has easy openability, excellent low-temperature heat sealability and little heat sealing temperature dependence of the heat seal strength, and which is suitable as a sealing portion of a packaging material produced, for example, films or sheets of polypropylene and other various resins, or sheets obtained by laminating such resin films.

According to this invention, there is provided a heat seal material having a plurality of resin surfaces which are positioned face to face and can be heat-fused together, at least one of the resin surfaces being formed of a resin composition comprising (A) 30 to 85% by weight of low-density polyethylene having a density of 0.91 to 0.94 g/cm$^3$,
(B) 5 to 40% by weight of polypropylene, and
(C) 10 to 40% by weight of a low-crystalline or substantially amorphous ethylene/alphaolefin copolymer.

The resin composition which constitutes at least one of the resin surfaces of the heat seal material of this invention will be described in detail.

Low-density polyethylene (A)

The low-density polyethylene used in the resin composition includes a homopolymer of ethylene and substantially linear copolymers of ethylene with a minor proportion of an alpha-olefin which have a density of 0.91 to 0.94 g/cm$^3$, especially 0.91 to 0.93 g/cm$^3$, and a crystallinity of more than 40%. The alpha-olefin may be, for example, at least one alpha-olefin selected from alpha-olefins having 3 to 10 carbon atoms, preferably 3 to 6 carbon atoms and optionally having a branched chain, such as propylene, 1-butene, 4-methyl-1-pentene, 1-hexene, 1-octene and 1-decene. The alpha-olefin may be used in an amount of not more than 8 mole %, preferably not more than 6 mole %, based on the total amount of ethylene and the alpha-olefin.

Homopolymerization of ethylene may be carried out generally in the presence of a radical initiator under a reaction pressure of about 6,000 to 3,000 atmospheres. Copolymerization of ethylene with the alphaolefin may be carried out by a known method such as a slurry or solution polymerization method under a low to medium pressure.

Conveniently, the resulting ethylene homopolymer or copolymer has a melt flow rate [MFR (E)] of usually 0.5 to 30 g/10 min., preferably 1 to 15 g/10 min., more preferably 1 to 10 g/10 ml.

The polymer (A) has a crystallinity, measured by X-ray diffractometry using a quenched press sheet sample, of more than 40%.

The melt flow rates [MFR (E)] in the present specification and the appended claims are measured by the method of ASTM D1238, E.

Polypropylene (B)

The polypropylene in the resin composition used in this invention include a homopolymer of propylene and copolymers of propylene with a minor proportion of ethylene or another alpha-olefin. The alpha-olefin to be copolymerized with propylene may be an alpha-olefin usually having 4 to 10 carbon atoms, preferably 4 to 6 carbon atoms, such as 1-butene, 4-methyl-1-pentene, 1-hexene and 1-octene. The ethylene and/or at least one of these alpha-olefins may be used in an amount of not more than 10 mole %, preferably not more than 5 mole %, based on the total amount of such an alpha-olefin and the propylene. The copolymer may be a random copolymer or a block copolymer, the random copolymer being preferred.

Homopolymerization or copolymerization of propylene may be carried out by known methods, for example, by a slurry polymerization method or a gas-phase polymerization method.

Generally, the polypropylene is desirably crystalline. Usually, it may have a crystallinity, measured by X-ray diffractometry, of at least 50%, preferably at least 55%. Desirably, the polypropylene has a melt flow rate [MFR (L)] of usually 0.5 to 50 g/10 min., preferably 1 to 10 g/10 min., especially preferably 3 to 10 g/10 min.

Ethylene/alpha-olefin copolymer (C)

The ethylene/alpha-olefin copolymer used in the resin composition includes ethylene/alpha-olefin copolymers, particularly ethylene/alpha-olefin random copolymers, having an ethylene content of generally 75 to 95 mole %, preferably 78 to 93 mole %, more preferably 85 to 93 mole %.

The ethylene/alpha-olefin copolymer is low-crystalline or amorphous, and has a crystallinity, measured by X-ray diffractometry using a quenched press sheet sample, of not more than 40%, preferably not more than 30%, more preferably not more than 20%.

The alpha-olefin to be copolymerized with ethylene may be at least one alpha-olefin containing 3 to 10 carbon atoms, preferably 3 to 6 carbon atoms and optionally having a branched chain, such as propylene, 1-butene, 4-methyl-1-pentene, 1-hexene, 1-octene and 1-decene. Copolymerization of ethylene with the alpha-olefin may be carried out by known methods, such as a solution polymerization method.

The ethylene/alpha-olefin copolymer has a melt flow rate [MFR (E)] of usually 0.4 to 50 g/10 min., preferably 1 to 10 g/10 min., more preferably 1 to 5 g/10 min.

Resin composition

The resin composition constituting the resin surfaces of the heat seal material of the invention may be prepared by blending the low-density polyethylene (A), polypropylene (B) and ethylene/alpha-olefin copolymer (C). The blending proportions of these components may be as follows.

| Component | Blending proportions (% by weight) | | |
|---|---|---|---|
| | General range | Preferred range | More preferred range |
| (A) | 30–85 | 40–75 | 45–65 |
| (B) | 5–40 | 10–30 | 15–25 |
| (C) | 10–40 | 15–30 | 20–30 |

The above weight percentages are based on the total amount of the three components (A), (B) and (C).

The resin composition may usually contain various additives used for polyolefin, such as a heat stabilizer, a weatherability stabilizer, an antistatic agent, an antihaze agent, an antiblocking agent, a slip agent, a lubricant, a pigment, a dye and a nucleating agent.

The resin composition can be used as a resin surface (heat seal surface) of a heat seal material by processing it into a film or sheet form. The resin composition may be used as a resin material constituting two opposite heat seal surfaces of a heat seal material. Usually, it is convenient to use the resin composition as a resin material for one heat seal surface, and another resin material heat fusible with it as a material for the other heat seal surface. Examples of the other resin material are polypropylene, polyvinyl chloride and polystyrene. Polypropylene is especially convenient.

As demonstrated by working examples given hereinafter, the heat seal material of this invention has excellent low-temperature heat sealability, easy openability, excellent interfacial peelability, and little dependence of its heat seal strength on the heat sealing temperature. It can be advantageously used as a heat seal material for various simple packaging materials. Examples of such a packaging materials are a container of a resin such as polypropylene with a closure having heat seal surfaces made of the above resin composition and a packing bag of a resin film having heat seal surfaces at least one of which is made of the above resin composition. These packaging materials are generally sealed packaging materials. They may have ventilation holes, and sealed packing is not always necessary.

The easily openable packing material using the heat seal material of this invention can hold an article by heat sealing its heat seal surfaces while or before the article is put in it. In the packed state, the article is protected from external forces such as impact, vibration and compression that occur in production and in the distribution chain including shipping, transportation and storage. By applying a peeling force to the heat seal portion, the heat seal surfaces are separated easily and the packed article can be taken out.

When the resin composition for use in the seal material of this invention is used in at least one heat seal surface of a closure material for a resin container or in at least one heat seal surface of a packaging bag of a resin film, at least one surface of the closure material or the packing bag may be constructed of the resin composition alone. To impart such functions as resistance to gas permeation, oil resistance, scratch resistance and rigidity, it is preferred to laminate a saponified ethylene/vinyl copolymer, a polyester, a polyamide, polyvinylidene chloride, an aluminum foil or a biaxially stretched polypropylene film to the resin composition.

The following examples illustrate the present invention more specifically.

EXAMPLES 1–3

Low-density polyethylene (LDPE) obtained by high-pressure radical polymerization and having a crystallinity of 56%, a density of 0.918 g/cm$^3$ and an MFR (E) of 2.0 g/10 min., an ethylene/1-butene random copolymer (EBC) having an ethylene content of 89 mole %, a crystallinity, determined by X-ray diffractometry, of 10%, a density of 0.885 g/cm$^2$ and an MFR (E) of 3.6 g/10 min. and a propylene homopolymer (PP-1) having an MFR (L) of 7.0 g/10 min. were mixed by a Henschel mixer in the proportions shown in Table 1. The mixture was extruded from a 40 mm T-die film forming machine kept at a temperature of 230° C. to form a film having a thickness of 40 μm. Separately, a homopolymer of propylene having an MFR (L) of 7.0 g/10 min. was molded into a sheet having a thickness of 200 μm. The film and the sheet were heat-sealed by the following method, and the heat seal strength was measured. At the same time, the state of peeling was observed.

Method of Measuring the Heat Seal Strength

The sheet and the film were laid one on top of the other. A seal bar having a width of 5 mm set at each of the temperatures shown in Table 1 was applied to the laid assembly under a pressure of 2 kg/cm$^2$ for 1 second. The sealed assembly was then allowed to cool. A test piece having a width of 15 mm was cut out from the sample and its T-peel strength at a crosshead speed of 300 mm/min. was measured, and defined as the heat seal strength (g/15 mm width).

State of peeling
X: interface peeled
N: interface peeled with elongation
O: seal portion broken The heat seal strengths and the states of peeling are shown in Table 1.

EXAMPLES 4-5

Example 1 was repeated except that propylene/ethylene random copolymer (PP-2) having an ethylene content of 4.5 mole % and a melting point, determined by the DSC method, of 135° C. was used instead of PP-1, and the mixing proportions of LDPE and EBC were adjusted as shown in Table 1. The results are shown in Table 1.

EXAMPLE 6

Example 1 was repeated except that linear low-density polyethylene (L-LDPE) having a crystallinity of 51%, MFR (E) of 2.0 g/10 min., a density of 0.920 g/cm$^2$ and a 4-methyl-1-pentene content of 3.0 mole % was used instead of LDPE, and the mixing proportions of EBC and PP-1 were adjusted as indicated in Table 1. The results are shown in Table 1.

COMPARATIVE EXAMPLE 1

Example 1 was repeated except that PP-1 was not used and the mixing proportions of LDPE and EBC were changed as indicated in Table 1. It is seen from Table 1 that when PP-1 was not used, the heat seal strength with respect to the polypropylene sheet was not sufficient.

COMPARATIVE EXAMPLE 2

Example 1 was repeated except that EBC was not used and the mixing proportions of LDPE and PP-1 were adjusted as shown in Table 1. The results are shown in Table 1. It is seen from Table 1 that when EBC was not used, the heat seal strength and the temperature dependence of the heat seal were good, but the seal portion was broken when the heat sealed surfaces were peeled apart, and the seal portion was susceptible to cohesive destruction. When such a film is used as a peeling layer, part of the seal layer tends to remain on the peeled surface.

COMPARATIVE EXAMPLE 3

Comparative Example 2 was repeated except that PP-2 was used instead of PP-1. The results are shown in Table 1. It is seen from Table 1 that the same tendency as in Comparative Example 2 was observed.

COMPARATIVE EXAMPLE 4

Comparative Example 1 was repeated except that L-LDPE used in Example 6 was used instead of LDPE. The results are shown in Table 1. It is seen from Table 1 that the heat seal strength increased, but the state of peeling was the same as in Comparative Example 2.

COMPARATIVE EXAMPLE 5

Example 1 was repeated except that LDPE was not used and the mixing proportions of EBC and PP-1 were adjusted as shown in Table 1. The results are shown in Table 1. It is seen from Table 1 that the heat seal temperature was high, and the temperature dependence of the heat seal strength was larger than in Examples 1 to 6.

TABLE 1

|  |  | Example | | | | | | Comparative Example | | | |
| --- | --- | --- | --- | --- | --- | --- | --- | --- | --- | --- | --- |
|  |  | 1 | 2 | 3 | 4 | 5 | 6 | 1 | 2 | 3 | 4 | 5 |
| LDPE |  | 70 | 60 | 50 | 60 | 50 |  | 70 | 80 | 80 |  |  |
| L-LDPE |  |  |  |  |  |  | 60 |  |  |  | 80 |  |
| EBC |  | 20 | 20 | 20 | 20 | 30 | 20 | 30 |  |  |  | 30 |
| PP-1 |  | 10 | 20 | 30 |  |  | 20 |  | 20 |  | 20 | 70 |
| PP-2 |  |  |  |  | 20 | 20 |  |  |  | 20 |  |  |
| Heat seal strength (g/15 mm width) | 100° C. |  |  |  |  |  |  |  |  |  |  |  |
|  | 110 |  |  |  |  |  |  |  | 190(X) | 80(X) |  |  |
|  | 120 | 270(X) | 90(X) | 20(X) | 680(X) | 420(X) | 450(X) |  | 290(O) | 390(O) |  |  |
|  | 130 | 260(X) | 390(N) | 340(N) | 690(X) | 480(X) | 530(X) |  | 290(O) | 350(O) | 280(X) |  |
|  | 140 | 370(X) | 410(N) | 350(N) | 670(X) | 490(X) | 800(N) |  | 290(O) | 420(O) | 570(X) |  |
|  | 150 | 340(X) | 440(N) | 400(N) | 830(X) | 550(X) | 840(N) | 40(X) |  |  | 890(O) | 300(X) |
|  | 160 | 530(X) | 440(N) | 420(N) | 860(X) | 560(X) | 860(N) | 460(X) | 330(O) | 400(O) | 830(O) | 700(N) |
|  | 170 | 540(X) | 430(N) | 420(N) | 860(X) | 560(X) | 820(N) | 90(X) |  |  | 820(O) | 900(N) |
|  | 190 | 520(X) | 400(O) | 470(O) | 800(X) | 540(X) |  | 70(X) |  |  |  | 1050(N) |

We claim:

1. A heat seal material having a plurality of resin surfaces which are positioned face to face and can be heat-fused together and, thereafter, is easily openable, one of the resin surfaces being formed of a resin composition comprising
   (A) 45 to 65% by weight of high-pressure-polymerized low density ethylene homopolymer or linear low-density copolymer of ethylene and $C_2$-$C_{10}$ alpha-olefin, having a density of 0.91 to 0.94 g/cm$^3$, a crystallinity of more than 40% and a melt flow rate of 1 to 10 g/10 min,
   (B) 15 to 25% by weight of polypropylene having a melt flow rate of 3 to 10 g/10 min, and
   (C) 20 to 30% by weight of a low-crystalline or substantially amorphous ethylene/alpha-olefin copolymer having an ethylene content of 85 to 93 mole % and a melt flow rate of 1 to 5 g/10 min,
   and a second heat seal surface formed of a different resin composition comprising polypropylene.

2. The heat seal material of claim 1 in which the ethylene/alpha-olefin copolymer has a crystallinity of not more than 40%.

3. An easily openable simple packaging material having the heat seal material of claim 1.

4. The heat seal material of claim 1 wherein the resin composition further comprises at least one additive selected from heat stabilizers, weatherability stabilizers, anti-static agents, anti-haze agents, anti-blocking agents, slip agents, lubricants, pigments, dyes and nucleating agents.

* * * * *